United States Patent [19]

Giringer et al.

[11] Patent Number: 4,918,384

[45] Date of Patent: Apr. 17, 1990

[54] SPRING CONTACT PIN FOR TESTING AN ELECTRICAL AND/OR ELECTRONIC DEVICE

[75] Inventors: Klaus Giringer, Herrenberg; Jochen Laube, Constance, both of Fed. Rep. of Germany

[73] Assignee: Feinmetall GmbH, Herrenberg, Fed. Rep. of Germany

[21] Appl. No.: 205,434

[22] Filed: Jun. 10, 1988

[30] Foreign Application Priority Data

Jun. 10, 1987 [DE] Fed. Rep. of Germany ....... 3719309

[51] Int. Cl.[4] ................................................ G01K 1/06

[52] U.S. Cl. ................................ 324/158 P; 324/72.5

[58] Field of Search ............... 324/158 P, 72.5, 158 F; 437/8; 439/482

[56] References Cited

U.S. PATENT DOCUMENTS

| | | | |
|---|---|---|---|
| 4,189,203 | 2/1980 | Miller | 439/482 |
| 4,504,780 | 3/1985 | Marsella | 324/72.5 |
| 4,528,500 | 7/1985 | Lightbody et al. | 324/158 P |
| 4,658,212 | 4/1987 | Ozawa et al. | 324/158 P |

FOREIGN PATENT DOCUMENTS

| | | | |
|---|---|---|---|
| 3706652 | 10/1987 | Fed. Rep. of Germany | 324/158 P |
| 0257904 | 6/1988 | Fed. Rep. of Germany | 439/482 |
| 0195164 | 11/1984 | Japan | 324/158 P |

*Primary Examiner*—Reinhard J. Eisenzopf
*Assistant Examiner*—Edward Urban
*Attorney, Agent, or Firm*—Herbert Dubno

[57] ABSTRACT

The spring contact pin contacts electrical or electronic items or devices to be tested for testing purposes. It comprises a sleeve, at least one contact bolt slidable in it and at least two springs which spring load the contact bolt. At least one inner spring is located inside the sleeve guiding the contact bolt slidably. An outer coil spring is positioned on a portion of the shank of the contact bolt extending beyond the sleeve exteriorly so that the spring contact pin can be shortened and the spring travel can be reduced for a given fixed spring force and because of that cost savings may be attained.

10 Claims, 1 Drawing Sheet

27
22
21
31
12
20
17
26
30
25
15
29
16
24
23
13
11
10
19
24'
16'
25'
15'
20'
26'
14
21'
26''
17'
24''
35
34
36
39

SPRING CONTACT PIN FOR TESTING AN ELECTRICAL AND/OR ELECTRONIC DEVICE

FIELD OF THE INVENTION

Our present invention relates to a spring contact pin or a spring-loaded electrical contact device used to contact an electrical or electronic circuit article to be tested by an electrical and/or electronic testing device.

BACKGROUND OF THE INVENTION

A spring contact pin for contacting an electrical or electronic circuit article to be tested such as a circuit board or an integrated circuit for test purposes is generally electrically conductive and can comprise a sleeve in which one shank of a front contact bolt is guided slidably and projects from the front end of the sleeve, a contact head serving to contact the item or the device to be tested being provided on the end of the shank of the front contact bolt located outside the sleeve and at least one inner spring within the sleeve and acting on the front contact bolt to spring load the contact bolt in the sleeve.

Spring contact pins are known from and described in Krüger: "Prüfmittel zur Elektrischen Prüfung von Leiterplatten für Uhren", Jahrbuch der Deutschen Gesellschaft für Chronometrie, Band 30, 1979, S. 269(Testing Means for Electrical Testing of Circuit Boards for Watches, Yearbook of the German Chronometry Society, 30, pp. 269(1979). They each have a sleeve in which a coil spring is mounted which spring loads a straight contact bolt which projects from the sleeve exteriorly. This contact bolt has a shank or stem slidably mounted in the sleeve on which a contact head is mounted and which is intended to come into contact with the item to be tested.

The electrical or electronic circuit article to be tested can include a circuit board, an integrated circuit such as a chip or the like. A testing unit to test such an circuit article to be tested can have a test adapter which is connected to an electrical testing unit or analyzer or computer.

The test adapter chiefly has a plurality of spring contact pins arranged in a predetermined grid or other array in one or more plates parallel to each other and next to each other. The number of spring contact pins of a test adapter can, if necessary, be very large. Most test adapters have hundreds or thousands, often even many thousands of spring contact pins.

Each spring contact pin must exert a comparatively large force (contact force) with its contact head on the circuit article to be tested so that a reliable electrical contact occurs and oxidation layers, dirt layers or the like can be penetrated by the contact head at the position at which the circuit article is to be tested.

The required contact force in the known spring contact pin commonly used in practice is exerted by a single coil spring located in the sleeve and amounts mostly to more than 100 cN, often several hundred cN, but in many cases somewhat less than 100 cN. The spring exerting the contact force often must endure an extremely large number of load changes without breaking, e.g. millions of load changes, so that one should not load it to its extreme limit.

The spring contact pins must be mounted so as to be electrically insulated from each other side-by-side in the test adapter with very small spacing and may have only a very small maximum outer diameter so that they can be positioned on the test adapter in great density. The outer diameter of the circular cylindrical portion of the sleeve of the spring contact pin is usually from about 0.5 to 2.5 mm, but in many cases can be still larger or smaller.

The maximum outer diameter of the contact head mounted on the shank of the contact bolt should not exceed that of the sleeve if possible to avoid electrical contact between the contact heads of the close-spaced spring contact pins which are adjacent each other.

Also the length of the spring contact pin may be relatively small although it will be comparatively large in relation to the diameter of the sleeve. For example the length of the spring contact pins in the unloaded state is chiefly in a size range of about 1 to 12 cm.

OBJECTS OF THE INVENTION

It is an object of our invention to provide an improved spring contact pin free from disadvantages and/or drawbacks of earlier pins for a similar purpose.

It is also an object of our invention to provide an improved spring contact pin which provides means for attaining a larger spring force and/or a shorter structural length and/or a reduced spring stress to reduce the danger of spring fatigue breaking or weakening.

SUMMARY OF THE INVENTION

These objects and others which will become more readily apparent hereinafter are attained in accordance with our invention in a spring contact pin for contacting an electrical or electronic circuit article to be tested such as a circuit board or an integrated circuit for test purposes. The spring contact pin is electrically conductive and comprises a sleeve in which a shank of a front contact bolt is guided slidably and projects from the front end of the sleeve, a contact head serving to contact the item or the device to be tested being mounted or provided on the end of the shank of the front contact bolt located outside the sleeve. An inner spring bears on the front contact bolt to spring load the contact bolt located in the sleeve.

According to our invention on a portion of the shank of the front contact bolt projecting from the sleeve an outer coil spring is mounted to provide additional spring loading of the front contact bolt. The spring force of this external spring is exerted on the front contact bolt to add to the spring force exerted on the front contact bolt by the inner spring.

Since this spring contact pin has outside the sleeve an additional outer coil spring engaged with the shank of a contact bolt or on the shank of the front contact bolt acting to contact the circuit article to be tested in addition to the inner spring located in the sleeve, for a given maximum spring force its length may be reduced and as a result of the reduced length the manufacturing costs can be reduced.

A desired spring force may be attained with reduced stress on the spring, so that our invention lowers the stress on the spring and reduces the danger of spring breakage. The number of load changes which the spring can undergo without danger of breaking can be extremely large and larger than in the known spring contact pin with comparable dimensions and spring material.

The spring contact pin according to our invention can also be designed for a larger spring force. The parameters increasing the spring force, reducing the spring stress and reducing the length of the spring contact pin can be combined with each other in any desired manner according to choice. Particularly a short spring excursion or travel may be attained if desired. Also the space present in the spring contact pin for the spring means may be utilized better than was previously the case.

Advantageously one or more springs, preferably a single spring can be positioned inside the sleeve, since a single spring is most appropriate because the smallness of the sleeve inner diameter.

The inner spring located in the sleeve can generally be a coil spring, advantageously a cylindrical coil spring. However it can, if necessary, be another type of spring according to the structure of the sleeve. When the sleeve, as is generally the case, has a circular cross section, the inner spring located in it can be a coil spring for best use of the space available for it. As the situation allows, several coil springs can connect to each other in the sleeve, the outer coil spring surrounding the shank of the contact bolt outside the sleeve still providing an additional spring force and/or a service life increase.

A reduced length of the spring contact pin can result since the spring forces of the springs engaged with the contact bolts are additive. Thus the contact force exerted on the circuit article to be tested by the contact bolt can be increased and/or the stress on the spring and/or the length of the spring contact pin can be reduced.

When, which in many cases is possible, the sleeve is a flat sleeve in which a substantially platelike contact bolt is guided slidably, the inner spring located in the sleeve need not be a coil spring but can be a zigzag spring or a spring curved in some other way in a plane.

In many cases, the spring contact pin can have two contact bolts, a front and a rear contact bolt, guided slidably in opposing longitudinal end regions of the sleeve and which project from out of the sleeve ends.

The front contact bolt acts to contact the circuit article to be tested with its contact head. The rear contact bolt, which can be of substantially the same shape or construction as the front contact bolt, can act to contact a connecting contact on a test adapter.

The electrical connecting contact can, for example, be located on a special plate of the test adapter and then an additional electrical lead to a test unit or analyzer or computer of the testing device can be connected to it. The rear contact bolt can similarly be spring-loaded by an additional outer coil spring outside the sleeve on its shank in addition to the inner spring found in the sleeve. Hence, with the same given contact force the length of such a spring contact pin can be additionally shortened and thus costs can be reduced.

The sleeve forms a cylinder for the contact bolt in which it is guided slidably like a piston. The sleeve can be made in a single piece and the contact pin need only have one sleeve.

Although all parts of the spring contact pin can be metal, since the electrical conductivity should be as good as possible and as constant as possible along its entire length, in many cases it is also possible to for the outer spring from a nonmetal or an electrical insulator. Of course it is better to form the outer coil spring or springs from an electrically conductive metal since they then can cooperate in reducing the electrical resistance of the spring contact pin as much as possible which is a further advantage. In many cases it is also possible to make the sleeve or the inner spring from a nonmetal, however it is especially suitable because of the previously mentioned reasons to make the sleeve and the inner spring from metal.

One part or several parts or all parts of the spring contact pin can be provided with an appropriate metal layer to reduce the electrical contact resistance or transfer resistance.

All springs of the spring contact pin can be precompressed or under compressive prestress so that they permanently engage contact on the associated contact bolt whereby the spring travel required in operation can be considerably shortened especially to attain the desired contact force on the circuit article to be tested. Often this precompression may amount only to a millimeter. However in many cases at least one spring may not be precompressed can be engaged only temporarily with the associated contact bolt.

According to a further feature of our invention, the coil outer diameter of the outer coil spring can be larger than the coil outer diameter of the inner spring when it is formed as a coil spring so that the coil outer diameter of the outer coil spring in the resting position of the contact bolt on whose shank it is mounted can correspond approximately to the maximum outer diameter of the sleeve and/or the contact head of this contact bolt.

Preferably the outer coil spring is made of thicker spring wire than the inner spring and/or the outer coil spring has a greater spring constant than the inner coil spring.

Generally the inner spring is a compression spring. However in many cases the one inner spring can be formed as a tension spring which draws the associated contact bolt in the direction of the contact force exerted by it.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figures 1, 2, 3:
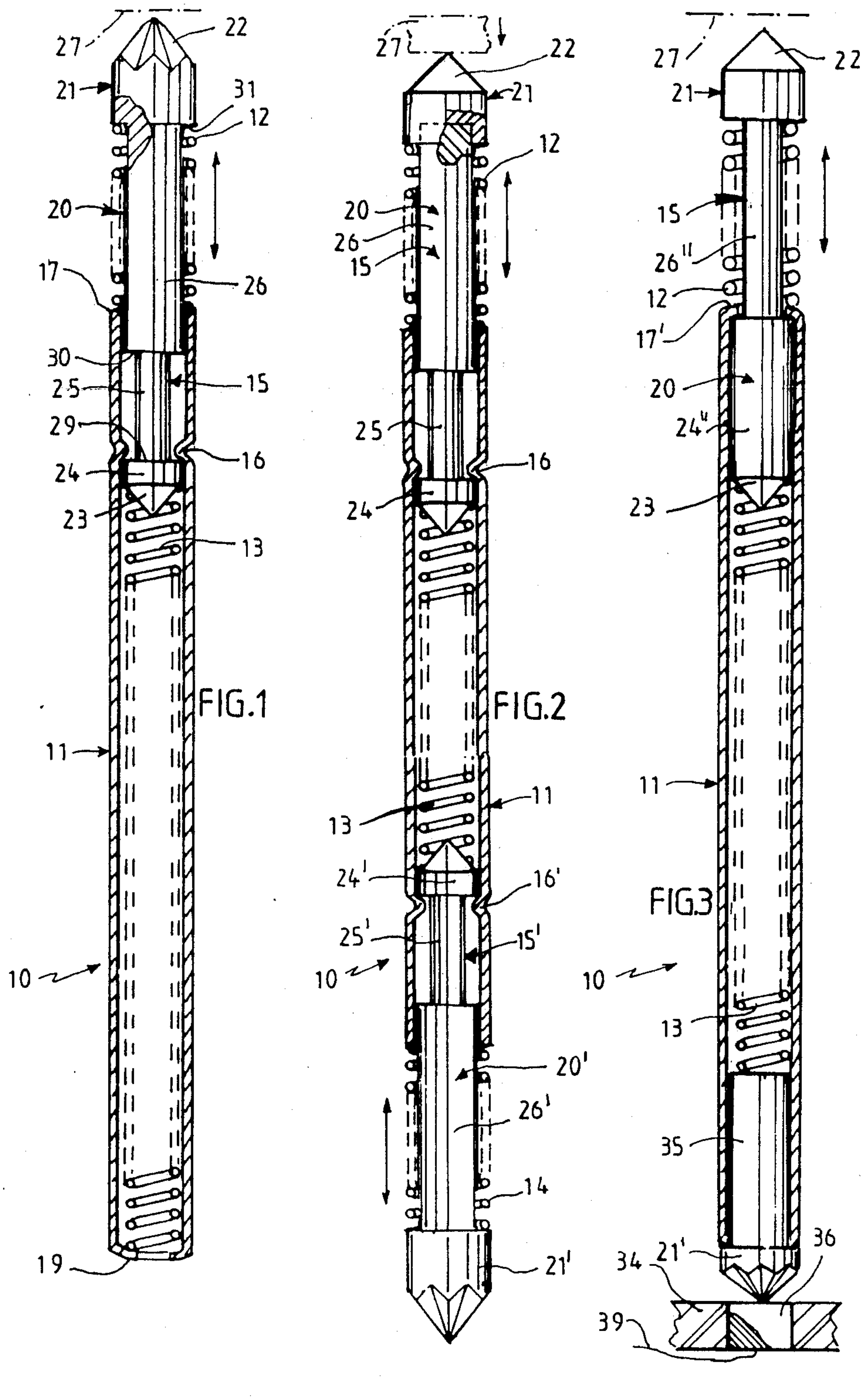
FIG. 1 is a longitudinal cross sectional view through one embodiment of a spring contact pin according to our invention.
FIG. 2 is a longitudinal cross sectional view through another embodiment of a spring contact pin according to our invention.
FIG. 3 is a longitudinal cross sectional view through an additional embodiment of a spring contact pin according to our invention.

The spring contact pin 10 shown in FIG. 1 comprises a straight sleeve 11, two precompressed cylindrical coil springs 12, 13 and a solid straight contact bolt 15 protruding from the front end of the sleeve 11. This front contact bolt 15 is the single contact bolt in this embodiment of the spring contact pin 10.

All parts of the spring contact pin 10 are made of a good electrical conductor metal (e.g. copper or an alloy thereof), and if necessary are provided with a metallic layer so that the pin is constantly conductive over its entire length.

The rotationally symmetrical straight sleeve 11 is made from a circular cylindrical tube in a single piece. This tube could be formed from plastic only at two places. One of these places is an inwardly directed circular collar 16 in the vicinity of the upper free front end 17 of the sleeve 11 and the other of these places, of these formed portions, involves the inwardly bent portion of the lower end portion of the sleeve 11 for formation of a baselike support or seat 19 for the cylindrical coil spring 13 advantageously precompressed and located in the sleeve 11. This spring 13 is referred to as the inner coil spring or inner spring.

The circular collar 16 located spaced axially from the upper front end 17 of the single sleeve 11 formed as a single piece forms a stop bounding the axial motion of the rigid or stiff front contact bolt 15.

Indeed the straight rotationally symmetrical front contact bolt 15 with a tip or point 22 having grooves or recesses formed by cutting comprises a shank 20 and a wider contact head 21 rigidly attached to it whose maximum outer diameter is larger than that of the shank 20 and which corresponds to that of the sleeve 11.

The shank 20 has a conically shaped lower end 23 on which the inner spring 13 continuously bears and which centers the upper end of this spring 13. In addition the shank 20 has as illustrated three circular cylindrical longitudinal portions 24, 25 and 26 connected to each other. The longitudinal portions 24 and 26 have substantially equal size outer diameters. The central longitudinal portion 25 located in the sleeve 11 connecting both these other portions 24, 26 has a smaller diameter and the circular collar 16 protrudes into the inside space in the sleeve 11 free of it as is illustrated.

The lower longitudinal portion 24 located permanently in the sleeve 11 and the long segment of the longitudinal portion 26 extending into the sleeve 11 are mounted with small sliding play in the sleeve 11 and thus form piston segments or regions of the shank 20 guided slidably in the sleeve 11.

The circular collar 16 bounds the axial up and down motion of the front contact bolt 15. The cylindrical coil spring 12 is mounted on the longitudinal portion 26 outside the sleeve 11 which is thus referred to as the "outer coil spring".

In the illustrated resting position of the contact bolt 15, in which its contact head is not loaded in the direction of the sleeve 11, the contact bolt 15 with the upper circular shoulder 29 of its longitudinal portion 24 is forced by the outer and inner springs 12, 13 against the circular collar 16 of the sleeve 11 which limits the upward motion of the contact bolt 15 relative to the sleeve 11.

From this "resting position" the contact bolt 15 can be pressed by a circuit article 27 to be tested indicated with a dot-dash line downwardly axially with a corresponding compression of the precompressed coil springs 12, 13.

The downward motion can occur until the lower circular shoulder 30 of the longitudinal section 26 contact the circular collar 16 of the sleeve 11. The forces of the springs 12 and 13 add. This allows an augmentation of the contact force and/or a shortening of the inner spring 13 and the sleeve 11. Thus the spring contact pin is shortened and costs can be saved which can exceed the additional costs of the outer coil spring and/or reduce the spring stress and thus increase its life. The spring excursion or displacement of each spring is substantially the same.

The outer coil spring 12 pushing on the part of the longitudinal portion 26 of the shank 20 extending beyond the sleeve 11 continuously bears under compression on the lower shoulder 31 of the contact head 21 and on the free upper front end 17 of the sleeve 11.

The solid front contact bolt 15 is in one piece in FIG. 1, however the contact head 21 can also advantageously be an replaceable part rigidly attached to the shank 20 which is the case for the spring contact pin 10 according to FIG. 2.

During testing of an circuit article 27 to be tested its spots or places to be contacted by the tip 22 of the contact head 21 are contacted by the contact head 21 and the front contact bolt 15 is axially slid downwardly by a predetermined distance relative to the sleeve 11 so that it is forced deeper into the sleeve 11 and the tip 22 of the contact head 21 is pressed firmly against to the contacted spot of the article 27 to be tested by the compression of the outer coil and inner springs 12, 13 having a definite compression force, of advantageously more than 100 cN, to make a good electrical contact. During withdrawal of the spring contact pin 10 from the circuit article 27 to be tested after testing, the contact bolt 15 again is returned to its illustrated resting position.

The straight spring contact pin 10 of FIG. 2 differs substantially from that shown in FIG. 1 since two straight front and rear contact bolts 15, 15' coaxial with each other are slidably mounted in opposite end portions of a substantially circular cylindrical sleeve 11. Also in this embodiment of the spring contact pin 10 all its parts are made of metal so that it is similarly constantly electrically conductive over its entire length. Both its front and rear contact bolts 15, 15' are spring-loaded by a compressed inner cylindrical coil spring 13 mounted inside the sleeve 11, since it contacts on the cone shape ends of the contact bolts 15, 15' projecting in both of its ends while being continuously centered.

Each contact bolt 15, 15' is constructed in principle like the front contact bolt 15 of FIG. 1 and bears with a fixed circular cylindrical longitudinal portion 24 and/or 24' located permanently inside the sleeve 11 in the unloaded resting position of the contact bolt 15 and/or 15' on the circular collar 16 and/or 16' of the sleeve 11, by the force of the precompression of the outer and inner springs 12, 13 and/or 13, 14.

The circularly cylindrical longitudinal portion 25 and/or 25' of reduced diameter is connected to this longitudinal portion 24 and/or 24' of the shank 20 and/or 20' of the contact bolt 15 and/or 15'. The longitudinal portion 25 and/or 25' at its opposing end is connected to the circular cylindrical longitudinal portion 26 and/or 26' of larger diameter which extends to the even wider contact head 21 and/or 21'. The front contact bolt 15 is completely rotationally symmetrical which is also true for the sleeve 11 on account of which the rear contact bolt 15' with the tip of its contact head 21' provided with recesses made with cuts or by cutting is made rotationally symmetrical.

The outer diameter of the longitudinal portions 26 and 26' are equal and correspond to that of the longitudinal portion 24 and 24'. These outer diameters are chosen so that the contact bolts 15,15' are guided slidably by the shank 20,20' in the sleeve 11 with small play or minimal clearance.

A cylindrical precompressed outer coil spring 12 and/or 14 is located on the parts of the longitudinal portion 26 and/or 26' of the shank 15 and/or 15' extending beyond the sleeve 11 and is braced on the end of the sleeve 11 involved and the contact head 21 and/or 21' so that the total spring force which is exerted on the front contact bolt 15 corresponds to the sum of the spring force of the outer coil and inner spring 12 and 13 and the total spring force exerted on the rear contact bolt 15', corresponds to the sum of the spring fore of the inner and outer coil springs 13 and 14.

The rear lower solid straight contact bolt 15' acts to contact a connector contact located in plate of a test adapter (not shown), of which an additional conductor leads to a test unit or computer or analyzer of the testing device involved. The upper contact bolt 15 is positioned to engage the circuit article 27 to be tested. Also in this spring contact pin 10 the outer coil springs 12 and 14 allow the shortening of the length of the spring contact pin and/or a higher spring force and/or a high number of load changes.

The spring contact pin 10 according to FIG. 3 differs from that according to FIG. 1. Its front contact bolt 15 like the front contact bolt 15 in the embodiment shown in FIG. 2 has a conical tip 22 on the contact head 21.

In addition, the shank 20 carrying the contact head 21 has a continuous circular cylindrical longitudinal portion 24" located permanently inside the straight sleeve 11 which alone acts to linearly guide the front contact bolt 15 in the sleeve 11 and a conical tip 23 is located on its underside for centering the inner cylindrical coil spring 13.

A circular cylindrical longitudinal portion 26" of the shank 20 of reduced diameter, which extends to the contact head 21 carried by it and on which the outer cylindrical coil spring 12 is braced on the upper front end 17' of the sleeve 11 and on the contact head 21, is connected to the longitudinal portion 24" of the shank 20 above it.

This outer coil spring 12 together with the inner spring 13 located inside the sleeve 11 spring load the contact bolt 15 slidably mounted in the sleeve 11, so that the total spring force acting on it corresponds to the sum of the spring forces of the springs 12 and 13. The upper contact bolt 15 acts to contact the item to be tested, of which an exterior contact 27 is indicated with dot-dash lines in the drawing, with the peak or tip 22.

The longitudinal portion 24" of the contact bolt 15 acting to slide the contact bolt 15 in the sleeve 11 is permanently located inside the sleeve 11 and is pressed in the resting position of the contact bolt 15 by the precompressed coil springs 12, 13 on the interiorly flanged edge of the front end 17' of the sleeve 11. On contacting a circuit article 27, to be tested the contact bolt 15 is pressed further into the sleeve 11 against increasing additive spring forces which are exerted by both the outer and inner coil springs 12, 13. In this embodiment the contact bolt 15 can be moved downwardly until the compressible spring is entirely pressed together.

In the spring contact pin according to FIG. 3 because of the thin portion 26" of the contact bolt shank 20 as compared to the portion 24" the outer coil spring 12 made from thicker wire is wound as in the embodiment according to FIGS. 1 and 2 which results in a larger spring constant and a reduced breaking danger.

Further the lower support for the inner coil spring 13 is formed by a pin or peg 35 pressed from below into the substantially circular cylindrical rotationally symmetrical sleeve 11. This pin 35 can however be slidably mounted in the sleeve 11 with play. This pin 35 has a widened contact head 21' located outside the sleeve.

This sleeve 11 of the spring contact pin 10 can be then positioned and held so that this contact head 21' is pressed into a connecting contact 36 rigidly set in a plate 34 of a test adapter, of which an electrical lead 39 is connected to a test unit or the like of the testing device involved.

The outer coil springs 12,14 are substantially shorter than the inner coil spring 13. This is especially appropriate because of the comparatively small projecting length of the contact bolt 15 beyond the associated sleeve 11. Advantageously the inner coil spring 13 of the spring contact pin 10 can be at least two times, advantageously at least three times longer than the outer coil spring 12 and/or 14.

In the examples or embodiments illustrated, all springs 12 to 14 are cylindrical coil springs. However in special cases noncylindrical coil springs such as conical springs or the like can be used as desired.

The individual solid contact bolt 15 is rigid or stiff and not compressible in the axial direction so that the ends of the precompressed springs 12,13 contacting it when it moves axially along a certain path, move with it. The same applies to the contacting bolt 15' and the ends of the springs 13, 14 contacting it.

The outer coil spring 12 and/or 14 has the important advantage that its outer coil diameter corresponds at least approximately to the outer diameter of the sleeve 11 and thus can be appropriately larger than the outer coil diameter of the inner spring 13. This allows the outer coil springs to have a considerably larger spring constant than the inner coil spring and hence, they can carry a heavier load. Also they are exposed to less breaking danger and can be made more economically.

Advantageously the outer coil spring 12 and/or 14 can be wound from thicker spring wire than the inner coil spring since this allows the outer coil spring at least in many cases to have the appropriately larger outer diameter.

It is however also possible and in many cases it is appropriate that the outer coil spring 12 and/or 14 be made of equally thick or thin spring wire as the inner spring 13.

As shown in FIG. 2 the portions 26, 26' of the shanks 20, 20' of the front and/or the rear bolt 15, 15' carrying the outer coil springs 12, 14 located outside the sleeve 11 can have the same outer diameter as at least one other portion 24, 24' of the shanks 20, 20' located permanently in the sleeve 11 acting to guide the contact bolts slidably.

By the "front" in reference to the sleeve or the contact bolt we mean the end of the sleeve or the contact bolt which is closest to the circuit article to be tested when that circuit article is engaged with the spring contact pin.

We claim:

1. A spring contact pin for contacting an electrical or electronic circuit article to be tested, said spring contact pin comprising:

- a continuous elongated sleeve open at least at a front end and having metallic conductivity over its entire length;
- an elongated front contact bolt axially slidable in said sleeve and received therein, said front contact bolt having:
  - a head outside said sleeve and spaced from said front end thereof, said head being formed with a tip engageable with said article and an annular shoulder facing said front end,
  - a shank extending from said shoulder into said sleeve at said front end and having a diameter less than that of said head, and an inner end of said front contact bolt located within said sleeve;

an elongated inner spring disposed within said sleeve and bearing at one end directly and continuously upon said inner end of said front contact bolt and biasing said front contact bolt outwardly from said front end of said sleeve;

means located within said sleeve for supporting an opposite end of said inner spring to enable said inner spring to bias said front contact bolt outwardly;

means located within said sleeve and engageable by said inner end of said front contact bolt for limiting displacement of said bolt outwardly from said front end of said sleeve; and an outer spring surrounding said shank and braced continuously between said shoulder and said front end of said sleeve for continuously biasing said bolt outwardly so that spring forces of said inner spring and said outer spring are simultaneously applied additively to said front contact bolt.

2. The spring contact pin defined in claim 1 wherein said sleeve is a one-piece metal sleeve.

3. The spring contact pin defined in claim 1 wherein said means located within said sleeve and supporting said inner spring is a rear contact bolt axially slidable in said sleeve and received therein, said rear contact bolt having:

a head outside said sleeve and spaced from a rear end thereof, said head of said rear contact bolt being formed with a tip engageable with a test adapter and an annular shoulder facing said rear end of said sleeve, a shank extending from said shoulder of said rear contact bolt into said sleeve at said rear end of said sleeve and having a diameter less than that of said head of said rear contact bolt, and an inner end of said rear contact bolt located within said sleeve and engaged by said inner spring for supporting same, said spring contact pin further comprising:

another outer spring surrounding said shank of said rear contact bolt and braced continuously against the shoulder of said rear contact bolt and said rear end of said sleeve.

4. The spring contact pin defined in claim 1 wherein said sleeve is cylindrical and said means located within said sleeve and engageable with said inner end of said front contact bolt for limiting displacement of said front contact bolt is an inwardly directed circular collar engageable with another head formed on said front contact bolt at said inner end adjoining a portion of said front contact bolt of lesser diameter than said shank.

5. The spring contact pin defined in claim 1 wherein said outer spring is shorter than said inner spring.

6. The spring contact pin defined in claim 5 wherein said inner spring has a length which is at least twice the length of said outer spring.

7. The spring contact pin defined in claim 1 wherein said outer spring, said head and said sleeve have substantially the same outer diameters.

8. The spring contact pin defined in claim 1 wherein said outer spring is composed of a thicker spring wire and has a larger spring constant than said inner spring.

9. The spring contact pin defined in claim 1 wherein said means for supporting said inner spring is an inwardly bent collar formed at a rear end of said sleeve.

10. The spring contact pin defined in claim 1 wherein said means for supporting said inner spring is a further contact bolt lodged in a rear end of said sleeve.

* * * * *